United States Patent
Kim et al.

(10) Patent No.: US 9,769,801 B2
(45) Date of Patent: Sep. 19, 2017

(54) METHOD AND APPARATUS FOR UPDATING INFORMATION REGARDING SPECIFIC RESOURCE IN WIRELESS COMMUNICATION SYSTEM

(71) Applicant: LG ELECTRONICS INC., Seoul (KR)

(72) Inventors: Seongyun Kim, Anyang-si (KR); Seungkyu Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 87 days.

(21) Appl. No.: 14/440,552

(22) PCT Filed: Nov. 5, 2013

(86) PCT No.: PCT/KR2013/009938
§ 371 (c)(1),
(2) Date: May 4, 2015

(87) PCT Pub. No.: WO2014/069968
PCT Pub. Date: May 8, 2014

(65) Prior Publication Data
US 2015/0305008 A1    Oct. 22, 2015

Related U.S. Application Data

(60) Provisional application No. 61/722,246, filed on Nov. 5, 2012, provisional application No. 61/752,997, filed
(Continued)

(51) Int. Cl.
*H04W 72/04* (2009.01)
*H04W 4/00* (2009.01)

(52) U.S. Cl.
CPC ....... *H04W 72/0406* (2013.01); *H04W 4/005* (2013.01)

(58) Field of Classification Search
None
See application file for complete search history.

(56) References Cited

U.S. PATENT DOCUMENTS 7,809,811 B1 * 10/2010 Rao ............... G06F 15/173
709/221
2012/0066367 A1 * 3/2012 Chai ................. H04L 12/24
709/223
(Continued)

FOREIGN PATENT DOCUMENTS

EP          2 432 154 A1    3/2012
KR   10-2012-0111852 A     10/2012
(Continued)

*Primary Examiner* — Faruk Hamza
*Assistant Examiner* — Cassandra Decker
(74) *Attorney, Agent, or Firm* — Birch, Stewart, Kolasch & Birch, LLP

(57) ABSTRACT

The method for updating bootstrap information regarding a specific resource in a wireless communication system according to one embodiment of the present invention is performed by a terminal, and comprises the steps of: receiving, from a server, a specific operation instruction for an object instance of the terminal or a resource that belongs to the object instance; and executing, if the specific operation instruction is received through a specific interface, the specific operation instruction regardless of whether the target for the specific operation instruction exists within the terminal.

11 Claims, 8 Drawing Sheets

Related U.S. Application Data on Jan. 16, 2013, provisional application No. 61/809,404, filed on Apr. 7, 2013, provisional application No. 61/843,060, filed on Jul. 5, 2013, provisional application No. 61/845,372, filed on Jul. 12, 2013.

(56) References Cited

U.S. PATENT DOCUMENTS

| | | | | | |
|---|---|---|---|---|---|
| 2012/0266223 | A1* | 10/2012 | Yegin | ............... | G06F 21/57 726/7 |
| 2013/0325939 | A1 | 12/2013 | Shim et al. | | |
| 2014/0089478 | A1* | 3/2014 | Seed | ............... | H04W 4/001 709/222 |
| 2015/0055640 | A1* | 2/2015 | Wang | ............... | H04W 4/005 370/338 |

FOREIGN PATENT DOCUMENTS

| | | |
|---|---|---|
| WO | WO 2011/112683 A1 | 9/2011 |
| WO | WO 2012/141494 A2 | 10/2012 |
| WO | WO 2012/141555 A2 | 10/2012 |

* cited by examiner (a)

(b)

(c)

(d)

(a)

(b)

(a)

(b)

METHOD AND APPARATUS FOR UPDATING INFORMATION REGARDING SPECIFIC RESOURCE IN WIRELESS COMMUNICATION SYSTEM

CROSS REFERENCE TO RELATED APPLICATIONS

This application is the National Phase of PCT International Application No. PCT/KR2013/009938 filed on Nov. 5, 2013, which claims priority under 35 U.S.C. 119(e) to U.S. Provisional Application Nos. 61/722,246 filed on Nov. 5, 2012, 61/752,997 filed on Jan. 16, 2013, 61/809,404 filed on Apr. 7, 2013, 61/843,060 filed on Jul. 5, 2013 and 61/845,372 filed on Jul. 12, 2013, all of which are hereby expressly incorporated by reference into the present application.

TECHNICAL FIELD

The present invention relates to a method and an apparatus for updating information regarding a specific resource in a wireless communication system.

BACKGROUND ART

M2M (Machine to Machine) communication technology has come into the spotlight with the advent of ubiquitous era. M2M can be used for various applications such as e-health, smart grid, smart home, etc. In these applications, M2M devices having various hardware specifications are used and thus a protocol which can accept any type of M2M device is needed. Accordingly, it is necessary to develop an application layer protocol suitable for resource-constrained M2M devices. Such protocol is applicable to resource-constrained M2M devices and thus can also be applied to M2M devices having different specifications. M2M devices may need to change specific information stored therein in order to correct errors. In this case, it may be difficult to detect information stored in a corresponding M2M device, which needs to be corrected or generated, due to errors in the M2M device. M2M service providers may not need to discriminate information correction from information creation. Accordingly, the present invention proposes a method for updating bootstrap information irrespective of presence or absence of the information in an M2M device. Accordingly, the present invention provides a method for updating information regarding a specific resource from an M2M server or an M2M bootstrap server.

DISCLOSURE

Technical Problem

An object of the present invention devised to solve the problem lies in a method for updating information regarding a specific resource from an M2M server or an M2M bootstrap server, that is, for performing partial information update.

The technical problems solved by the present invention are not limited to the above technical problems and those skilled in the art may understand other technical problems from the following description.

Technical Solution

The object of the present invention can be achieved by providing a method for updating, by a terminal, bootstrap information regarding a specific resource in a wireless communication system, including: receiving, from a server, a specific operation instruction for an object instance of the terminal or a resource belonging to the object instance; and performing the specific operation instruction when the specific operation instruction is received through a specific interface, regardless of whether a target with respect to the specific operation instruction exists within the terminal.

Preferably, the method may further include determining whether the specific operation instruction is received through the specific interface.

Preferably, the specific operation instruction may be one of a write operation instruction and a create operation instruction.

Preferably, when the specific operation instruction is received through the specific interface, access control for the specific operation instruction may not be performed.

Preferably, the method may further include determining whether a server transmitting the specific operation instruction is the same as a server indicated by a specific resource included in the specific object instance Preferably, the specific object instance may include an M2M server security object instance.

Preferably, the specific resource may include a resource indicating an identifier of an M2M server and a resource indicating a bootstrap server.

Preferably, the method may further include creating an M2M server security object instance and an M2M server object instance related to the M2M server security object instance when the specific operation instruction is for addition of a new server account.

Preferably, the method may further include creating an access control object instance for the created M2M server object instance when the specific operation instruction for addition of a new server account is received when only one server account is present in the terminal.

Preferably, the method may further include, when the specific operation instruction indicates a specific M2M server security object and an M2M server security object instance related to the specific M2M server security object, and a specific M2M server object and an M2M server object instance related to the specific M2M server object, creating the specific M2M server security object instance and the specific M2M server object instance.

Preferably, the method may further include creating an access control object instance for the created M2M server object instance when the specific operation instruction is received when only one server account is present in the terminal.

In another aspect of the present invention, provided herein is a terminal configured to update bootstrap information regarding a specific resource in a wireless communication system includes: a radio frequency (RF) unit; and a processor configured to control the RF unit, wherein the processor is configured to receive, from a server, a specific operation instruction for an object instance of the terminal or a resource belonging to the object instance and to perform the specific operation instruction when the specific operation instruction is received through a specific interface, regardless of whether a target with respect to the specific operation instruction exists within the terminal.

The aforementioned technical solutions are merely parts of embodiments of the present invention and various embodiments in which the technical features of the present invention are reflected can be derived and understood by a person skilled in the art on the basis of the following detailed description of the present invention.

Advantageous Effects

According to an embodiment of the present invention, it is possible to efficiently update a specific resource from an M2M server or an M2M server. The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
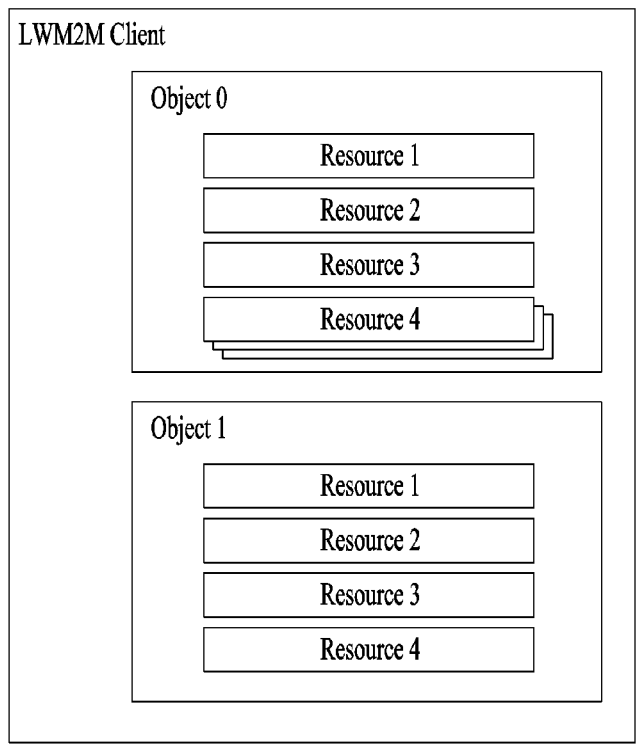
FIG. 1 illustrates a structure of data stored in an M2M client.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a device for M2M communication, that is, an M2M client or terminal may be fixed or mobile and includes a server for M2M communication, that is, an M2M server or a device which communicates with the server to transmit/receive user data and/or control information. The M2M client may be referred to as terminal equipment, MS (Mobile Station), MT (Mobile Terminal), UT (User Terminal), SS (Subscribe Station), wireless device, PDA (Personal Digital Assistant), wireless modem, hand-held device, etc. In addition, the M2M server refers to a fixed station communicating with M2M terminals and/or other M2M servers and exchanges data and control information with M2M terminals and/or other M2M servers by communicating therewith.

A description will be given of the related art.

Device Management

Device management refers to management of device configuration and other managed objects of devices from the point of view of various management authorities. Device management includes, but is not restricted to setting initial configuration information in devices, subsequent updates of persistent information in devices, retrieval of management information from devices and processing events and alarms generated by devices.

Management Tree

Management tree refers to an interface by which a management server interacts with a client, e.g. by storing values in the management tree or retrieving values from the management tree and by manipulating the properties of the management tree, for example, access control lists. In the specification, the term management tree can be used interchangeably with the term device management tree or DM tree.

Management Object (MO)

A management object is a subtree of the management tree which is intended to be a (possibly singleton) collection of nodes which are related in some way. For example, ./DevInfo Nodes form a management object. A simple management object may consist of one single node.)

Device Management (DM) Server

A DM server may be an abstract software component in a deployed device management infrastructure that conforms to OMA device management enabler static conformance requirements specified for DM servers. The DM server serves as an end-point of DM client-server protocols and a DM server-server interface.

In the specification, the DM server may be mounted in a device, computer, etc. including a communication module, a processor module, etc.

Device Management (DM) Client

A DM client may be an abstract software component in a device implementation that conforms to OMA device management Enabler static conformance requirements specified for DM clients. The DM client serves as an end-point of the DM client-server protocols.

In the specification, the DM client may be mounted in a device including a communication module, a processor module, etc., which is an object of DM. The DM client may be implemented as a single device.

Access Control List (ACL)

An ACL refers to a list of DM server identifiers regarding a specific node in a management tree and access rights associated with each identifier.

Node

A Node is a single element in a management tree. There can be two kinds of nodes in a management tree: interior nodes and leaf nodes. The format property of a node provides information about whether the node is a leaf or an interior node.

Interior Node

An interior node is a node that may have child nodes, but cannot store any value allocated to a node, that is, a node value. The format property of an interior node is "node".

Leaf Node

A leaf node can store a node value, but cannot have child nodes. The format property of a leaf node is not "node".

Accordingly, all parent nodes must be interior nodes.

Permanent Node

A permanent node is permanent if the DDF property scope is set to permanent. If a node is not permanent, the node corresponds to a dynamic node. The permanent node cannot be dynamically generated or deleted by a server.

Dynamic Node

A dynamic Node is dynamic if the DDF property scope is set to dynamic or if the scope property is unspecified.

Sever Identifier

A server identifier refers to an OMA DM internal name for a DM server. A DM Server is associated with an existing server identifier in a device through OMA DM account.

ACL Properties and ACL Values

All terminals managed by a DM protocol have a single DM tree starting with a root node and the DM protocol performs management of terminals by manipulating each node of the DM tree. For example, to install downloaded software in a terminal, the software can be installed by executing a node "install" matched to the software. Each node may indicate simple information such as a numeral and complicated data such as graphical data or log data. In addition, a node may indicate a command such as "Execute", "Download" or the like.

Each node has properties of providing meta data related thereto. The properties include runtime which refers to duration of a node from generation of the node in the DM tree to extinction of the node. The runtime property includes an ACL, format, name, size, title, Tstamp, type and VerNo.

The ACL is mandatory such that both a terminal and a server need to implement the ACL in DM 1.3 protocol. The ACL specifies DM commands that a specific DM server can execute on a specific node. An unspecified command cannot be executed. In other words, the ACL refers to rights granted to a specific DM server for a specific node. In the DM protocol, the ACL is given to the server identifier of a DM server and is not assigned to a URI, an IP address and a DM server certificate. The server identifier is used as an identifier for authenticating the DM server in the DM protocol. Furthermore, the ACL can be provided as ACL property and an ACL value provided to the ACL property. In the specification, an ACL value may also be referred to as ACL information or information about the ACL. In DM 1.3 protocol, all nodes are defined to have the ACL property. All nodes having the ACL property are defined to have an empty ACL value or a non-empty ACL value.

The ACL has unique properties different from the runtime property. The unique properties include ACL inheritance. ACL inheritance refers to the concept of obtaining an ACL value for a node, which is included in a DM tree and does not have an ACL value, from the ACL value of the parent node of the node. If the parent node also does not have the ACL value, then the ACL value of the parent node is obtained from the ACL value of the parent node of the parent node. Since the root node corresponding to the highest node of the DM tree must have an ACL value in the DM protocol, the ACL value must be inherited. ACL inheritance is performed for all ACL values rather than being performed per DM command. Accordingly, ACL inheritance from the parent node of the node is carried out only when a node has an empty ACL value. That is, if an ACL value of a node specifies only "Add", unspecified "Get" is not inherited.

In the DM protocol, the root node has "Add=*&Get=*" as a basic value for ACL. Here, "*" denotes a wild card and means an arbitrary DM server. To get an ACL value, the DM server uses the "Get" command. The "Get" command regarding ./NodeA/Node1 gets an ACL value of ./NodeA/Node1. To change an ACL value, a "Replace" command is used. When "Replace" is executed on ./NodeA/Node1?prop=ACL" to set "Add=DMS1&Delete=DMS1&Get=DMS1", the ACL value is changed. In the DM protocol, an individual ACL entry cannot be changed and all ACL values can be changed. The right to get and change an ACL value is defined based on ACL. The right for an interior node and the right for a leaf node are differently defined.

Interior node: If the corresponding node has "Get" and "Replace" rights, it is possible to get and replace the ACL value of the corresponding node. "Replace" refers to the right to replace ACL values of all child nodes.

Leaf node: If a parent node of the corresponding node has "Replace" rights, the ACL value of the corresponding node can be replaced. The parent node needs to have "Get" rights in order to get the ACL of the corresponding node. Similarly, if the corresponding node has "Replace" rights, the ACL value of the node can be replaced. To replace the ACL value, the parent node of the corresponding node needs to have "Replace" rights.

The right to replace the ACL value of the corresponding node can be controlled by the ACL value of the parent node of the node irrespective of whether the node is an interior node or a leaf node. If an interior node has "Replace" rights, ACL values of all child nodes as well as the ACL value of the interior node can be replaced. Accordingly, if the root node has "Replace" rights, it is possible to have any right for all nodes in the DM tree. However, even when a parent node has "Replace" rights, specific rights such as "Get" and "Get" are not provided for a child node and right such as "Get" needs to be directly specified for the child node. Accordingly, the ACL value of the child node needs to be corrected prior to execution of a command and the ACL value of the child node is corrected by correcting ACL values of all nodes located before the corresponding child node. This is inconvenient and thus the DM protocol allows the ACL value of a corresponding node to be directly corrected without change of ACL values of intermediate nodes when the parent or ancestor node has "Replace" rights.

When a DM server generates a new node through command "Add", the generated node does not have an ACL value in general and thus gets the ACL value from the parent node thereof. However, when the generated node is an interior node and the parent node thereof does not have "Replace" rights, it is necessary to set the ACL value of the generated node at the same time when the node is generated to provide the right to manage the node.

The syntax for representing ACL values is defined in [DM-TND]. An exemplary ACL value is "Get=DMS1&Replace=DMS1&Delete=DMS2". Here, DMS1 and DMS2 are DM server identifiers and "Get", "Replace" and "Delete" are DM commands. Accordingly, DM server DMSI can execute "Get" and "Replace" on a corresponding node and DM server DMS2 can execute "Delete" on the corresponding node. Here, Get=DMS 1, Replace=DMS1 and Delete=DMS2 are ACL-entries and represent individual command rights of the DM servers. In other words, an ACL value is a set of individual ACL-entries and an ACL value of each node can include at least one ACL-entry.

DDF (Device Description Framework)

DDF is a specification for how to describe the management syntax and semantics for a particular device type. DDF provides information about MO, management functions and DM tree structure of terminals.

DM 1.3 Authentication

DM 1.3 performs authentication based on ACL. DM authentication is performed per DM command. If a DM server has transmitted a plurality of DM commands, a DM client (referred to as a DMC hereinafter) performs authentication prior to execution of the commands and executes only a DM command granted as a result of authentication.

DM Tree

A DM tree refers to a set of MO instances exposed by a DMC. The DM tree functions as an interface by a management server interacting with a client. For example, the management server can store and retrieve specific values from the DM tree and manipulate properties of the DM tree.

To perform communication between a server and a client in a conventional server-client model, information that needs to be shared/stored by the two entities (server and client) prior to communication is present. For this, a DM client is bootstrapped and a DM server or a DM bootstrap server transmits advance information necessary for communication with the DM server in DM. That is, the DM client transmits information necessary for communication with a specific DM server through bootstrapping to enable communication between the DM client and the DM server.

In an actual deployment situation, a DM client may be re-bootstrapped. For example, the DM client is re-bootstrapped when errors are continuously generated in communication between the DM client and a specific DM server. This can occur due to security key mismatch or for other reasons. While DM does not specify re-bootstrap, re-bootstrap is considered to refer to a case in which bootstrap is regenerated. In the case of bootstrap, information regarding a specific server (e.g., authority information of a corresponding server in an ACL) is initialized in addition to bootstrap information and thus it is necessary to transmit information about the corresponding server to a client even after re-bootstrap. Accordingly, the present invention provides a method for performing re-bootstrap while maintaining information using a method of providing/updating only specific information without performing entire bootstrap.

FIG. 1 illustrates a data structure stored in an M2M client. The M2M client (or terminal) may have entities corresponding to groups of resources referred to as "objects" corresponding to functions that can be implemented by the M2M client. An object identifier may be defined in object specification and an identifier that is not defined in the object specification may be set by an operator or manufacturer using the M2M system. A resource is an entity that stores data and may have a plurality of resource instances. Each object is generated and instantiated as an object instance by a specific operation and the M2M client can access the corresponding resource through the object instance.

In addition, information indicating an operation supported by a resource is included in or added to the resource. There are operations "Read", "Write", "Execute", "Write Attribute", "Discover", "Observe", etc.

Figure 2:
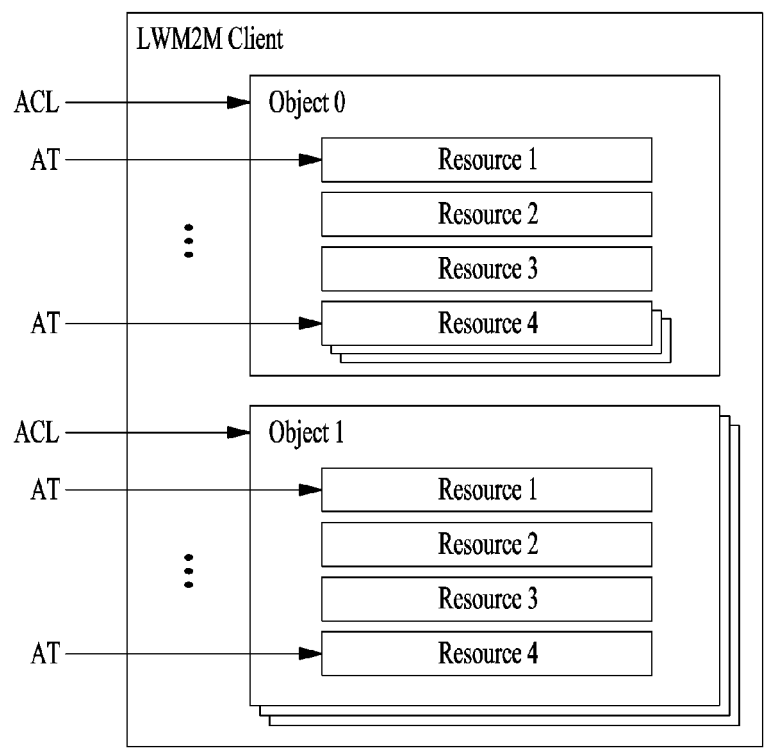
FIG. 2 illustrates a resource model according to an embodiment of the present invention.

FIG. 2 illustrates a resource model according to an embodiment of the present invention. An ACL (Access Control List) and an AT (Access Type) are assigned for control of access rights for resources to be used in the M2M system according to an embodiment of the present invention.

The ACL is assigned per resource corresponding to a specific function, that is, per object instance. Lower resources of each object instance are considered to be allocated the same ACL. That is, since the ACL is assigned per object instance, lower resources of each object instance have the same ACL.

Since an object instance is an entity corresponding to a resource group and is a group for executing a specific function, the same right should be granted for all resources in a group when the right for a specific function is granted for a specific server. When the same right is not granted, operation can be partially performed for a function. In this case, the function of the server becomes ambiguous and the meaning of granting authority is unclear. Accordingly, in an embodiment of the present invention, an ACL is assigned per object instance, as described above, to reduce overhead, compared to storage per resource, and to simplify an access right authentication procedure by using the same mechanism to find an ACL.

For reference, each object may be instantiated as a plurality of object instances.

The AT can be assigned per resource and define an access scheme supported by each resource. For example, when an access scheme is defined as operations, the AT can be defined as specific operations, for example, "Read", "Write" and "Execute".

The ACL and AT may be referred to by different terms. For example, the ACL can be referred to as access right and the AT can be referred to as a supportable operation.

Interface

A description will be given of an interface through which specific operations are transmitted between a server and a client (terminal) prior to description of embodiments of the present invention.

Four interfaces related to the present invention are present: 1) bootstrap, 2) Device (Client) Registration, 3) Device Management and Service Enablement and 4) information reporting. Operations for the four interfaces can be classified into uplink operations and downlink operations. Operations of the interfaces are shown in the following table.

TABLE 1

| Interface | Direction | Logical Operation |
| --- | --- | --- |
| Bootstrap | Uplink | Request Bootstrap |
| Bootstrap | Downlink | Write, Delete |
| Device(Client) Registration | Uplink | Register, Update, De-register |
| Device Management and Service Enablement | Downlink | Read, Create, Delete, Write, Execute, Write Attribute, Discover |
| Information Reporting | Downlink | Observe, Cancel Observation |
| Information Reporting | Uplink | Notify |

Figure 3:
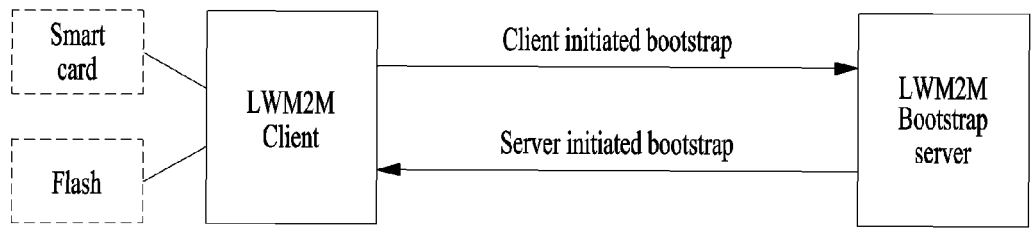
FIG. 3 illustrates interface models according to an embodiment of the present invention.
Figure 3:
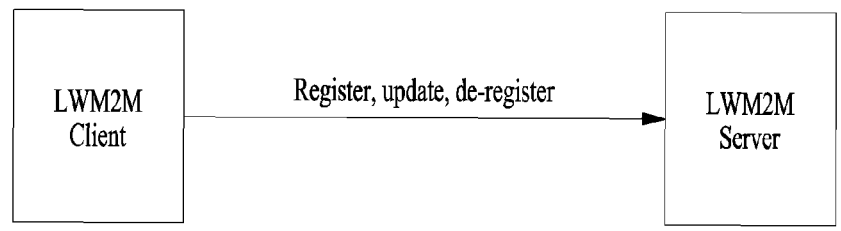
Figure 3:
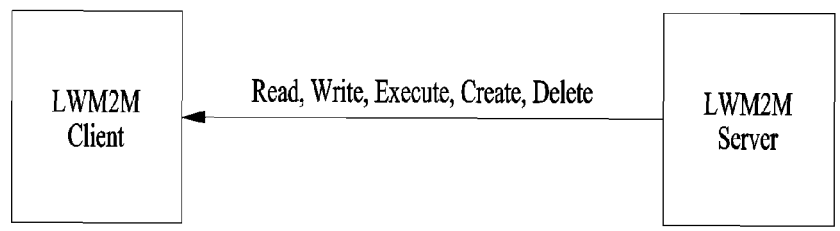
Figure 3:
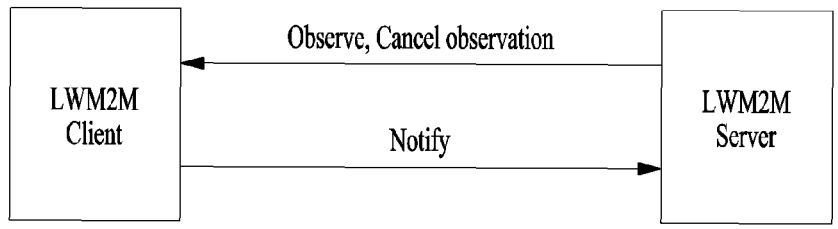

FIG. 3 illustrates the four interfaces. FIG. 3(a) illustrates an operation model for the bootstrap interface. For the bootstrap interface, operations include an uplink operation (i.e. client initiated bootstrap) called "Request bootstrap" and downlink operations (i.e. server initiated bootstrap) called "Write" and "Delete". These operations are used to initiate objects necessary for a client to register with one or more servers. Bootstrap is defined using a factory bootstrap (stored in a flash memory, for example) or a bootstrap (stored in a smart card) from the smart card.

FIG. 3(b) illustrates an operation model for "device (client) registration" interface. For the device registration interface, uplink operations called "Register", "Update" and "De-register" are present. "Register" is used to register information of a client in a server and "Update" is used to update the information or state of the client, registered in the server, periodically or according to an event generated in the client. "De-register" is operation of cancelling registration of the client with the server and the server can delete the information of the client according to "De-register".

FIG. 3(c) illustrates an operation model for the "device management and service enablement" interface. For the "device management and service enablement" interface, downlink operations called "Read", "Create", "Write", "Execute", "Write Attribute" and "Discover" are present. These operations are used for interaction with resources, resource instances, objects and object instances of the client. "Read" operation is used to read the current values of one or more resources, "Write" operation is used to update values of one or more resources and "Execute" operation is used to initiate operation defined by a resource. "Create" and "Delete" operations are used to create and delete object instances. "Write Attribute" is used to set an attribute related to "Observe" operation and "Discover" is used to discover the corresponding attribute.

FIG. 3(d) illustrates an operation model for the "information reporting" interface. For the information reporting interface, downlink operations called "Observe" and "Cancel observation" and an uplink operation called "Notify" are present. The information reporting interface is used to transmit a new value related to a resource on the client to the server. "Observe" is used for the server to observe a specific resource when the server is interested in resource change and "Cancel observation" is used when the corresponding observation is no longer performed (when the server no longer wishes to know about resource change). "Notify" is used to notify the server of observation condition attributes set through "Write Attribute" when the observation condition attributes are satisfied.

Data Model for Access Control

To reduce parsing process overhead and space overhead of an M2M device, server identifiers (IDs), ACL (or access right) and AT (or supportable operation) suitable for M2M environments are modeled.

Short Server ID

Information that needs to be included in an ACL must include information on a server and operations that the server can instruct. Server ID may be considerably long since the server ID is represented by a URI in general. Since an ACL needs to be represented per object instance and a long server ID is repeatedly used for object instances, the server ID may cause considerable space overhead depending on the number of object instances. Accordingly, the present invention proposes use of a short server ID having a fixed length (e.g. 2 bytes) for an ACL. The M2M client stores mapping relationship between short server IDs and server IDs and can find a short server ID corresponding to a server ID for an operation received from the server corresponding to the server ID and perform authentication through the corresponding ACL using the short server ID.

TABLE 2

| Identifier | Semantics | Description |
| --- | --- | --- |
| Short Server ID | 16-bit unsigned integer | Short integer ID allocated by a bootstrap server. This identifier uniquely identifies each M2M server configured for the M2M client. |

Access Control List (ACL) or Access Right

An ACL is allocated per object instance and corresponds to a list of ACL entries that designate access right for M2M servers. An ACL entry can be represented by a short server ID and access right of the corresponding server. A short server ID and an access right value are set to fixed short lengths to improve space overhead and processing efficiency during an authentication procedure. With regard to access right, a single bit value is allocated per M2M operation such that a specific operation is authenticated by reading only a single bit value to thereby improve processing efficiency. Default ACL entries for servers other than servers on the ACL can be set, and the M2M client can find a specific short server ID (e.g. 00000) when receiving operations with respect to all servers which are not on the ACL and authenticate the operations using the corresponding access right.

TABLE 3

| Field | Description |
| --- | --- |
| ACL | List of ACL entries |
| ACL entry | Composed of a short server ID and access right<br>Access right is composed of<br>$1^{st}$ lsb (least significant bit): Read<br>$2^{nd}$ lsb: Write<br>$3^{rd}$ lsb: Execute<br>Other bits are reserved for future use. |

The ACL entry shown in Table 3 is exemplary and can be set to different values.

Access Type (AT) or Supportable Operations

AT can designate operations supported by resources. One bit is mapped to one operation in the same manner as access right of ACL entry.

TABLE 4

| Field | Description |
| --- | --- |
| Access Type | $1^{st}$ lsb: Read<br>$2^{nd}$ lsb: Write<br>$3^{rd}$ lsb: Execute<br>Other bits are reserved for future use |

Access type shown Table 4 is exemplary and can be set to different values.

A brief description will be given of operations and objects (instances) described in the aforementioned embodiments and used in the specification.

Read

"Read" operation is used to access (read) values of individual resources, resource instances of an array, object instances or all object instances of an object and has the following parameters.

TABLE 5

| Parameter | Required | Default Value | Notes |
| --- | --- | --- | --- |
| Object ID | Yes | — | Indicates the object. |
| Object Instance ID | No | — | Indicates the object instance to read. If no object instance ID is indicated, then the object instances of objects, which the server is authorized to, are returned. |

TABLE 5-continued

| Parameter | Required | Default Value | Notes |
|---|---|---|---|
| Resource ID | No | — | Indicates the resource to read. If no resource ID is indicated, then the whole object instance is returned. |

Discover

"Discover" operation is used to discover individual resources, object instances and attributes (parameters) set for an object. "Discover" operation can be used to discover resources implemented in an object. Returned values correspond to a list of application/link-format CoRE Links (conform to application/link-format CoRE Links format of RFC6690) for each resource including attributes of the resource. "Discover" operation has the following parameters.

TABLE 6

| Parameter | Required | Default Value | Notes |
|---|---|---|---|
| Object ID | Yes | — | Indicates the object. |
| Object Instance ID | No | — | Indicates the object instance. |
| Resource ID | No | — | Indicates the resource. |

As specific functions of "Discover" operation, information on which resource is implemented and observe parameters configured to objection is returned when only the object ID from among the aforementioned parameters is specified, observe parameters set for a specified object instance can be returned when the object ID and the object instance ID from among the parameters are specified, and observe parameters set for a specific resource can be returned when the object ID, object instance ID and resource ID from among the parameters are specified.

Write

"Write" operation is used to change (write) a plurality of resource values in a resource, resource instances of an array or an object instance. "Write" operation permits a plurality of resources in the same object instance to be changed according to one command. That is, "Write" operation can access object instances (as well as individual resources). "Write" operation has the following parameters.

TABLE 7

| Parameter | Required | Default Value | Notes |
|---|---|---|---|
| Object ID | Yes | — | Indicates the object. |
| Object Instance ID | Yes | — | Indicates the object instance to write. |
| Resource ID | No | — | Indicates the resource to write. The payload is the new value for the resource. If no resource ID is indicated, then the included payload is an object instance containing the resource values. |
| New Value | Yes | — | The new value included in the payload to update the object instance or resource. |

Write Attributes

"Write attributes" operation is used to change (write) attributes of a resource or an object instance. "Write attributes" operation has the following parameters.

TABLE 8

| Parameter | Required | Default Value | Notes |
|---|---|---|---|
| Object ID | Yes | — | Indicates the object. |
| Object Instance ID | Yes | — | Indicates the object instance to write attributes. |
| Resource ID | No | — | Indicates the resource to write attributes. |
| Minimum Period | No | 1 | When present, the minimum period indicates the minimum time in seconds the client should wait from the time when sending the last notification to the time when sending a new notification. In the absence of this parameter, the minimum period is defined by the default minimum period set in the LWM2M server object instance related to that server. |
| Maximum Period | No | — | When present, the maximum period indicated the maximum time in seconds the client should wait from the time when sending the last notification to the time sending the next notification (regardless if the value has changed). In the absence of this parameter, the maximum period is up to the server. The maximum period must be greater than the minimum period parameter. In the absence of this parameter, the maximum period is defined by the default maximum period set in the LWM2M server object instance related to that server. |
| Greater than | No | — | When present, the client should notify its value when the value is above the number specified in parameter. |
| Less than | No | — | When present, the client should notify its value when the value is below the number specified in the parameter. |
| Step | No | — | When present, the client should notify its value when the value is changed more than the number specified in the parameter from the resource value when the client receives the observe operation.. |

The parameters "minimum period", "maximum period", "greater than", "less than" and "step" are only used in "Observe" operation. The parameters "maximum period" and/or "minimum period" are used to control how often "Notify" operation is transmitted by the M2M client for an observed object instance or resource. The parameters "greater than", "less than" and "step" are valid only when the resource ID is indicated. The parameters "greater than", "less than" and "step" need to be supported only when the resource type is number (e.g. integer, decimal).

Execute

"Execute" operation is used by the M2M server to initiate an operation and can be performed only for individual resources. The M2M client returns error when "Execute" operation is received for object instances or resource instances. "Execute" operation has the following parameters.

TABLE 9

| Parameter | Required | Default Value | Notes |
| --- | --- | --- | --- |
| Object ID | Yes | — | Indicates the object. |
| Object Instance ID | Yes | — | Indicates the object instance. |
| Resource ID | Yes | — | Indicates the resource to execute. |

Generate

"Generate" operation is used by the M2M server to generate an object instance in the M2M client. "Generate" operation needs to target one of an object instance or object that is not instantiated.

An object instance generated in the M2M client by the M2M server should be of an object type supported by the M2M client and of an object instance which is notified by the M2M client to the M2M server using "Register" and "Update" operations of the device registration interface.

An object that supports at most one object instance should be allocated an object instance ID of 0 when the object instance is generated. "Generate" operation has the following parameters.

TABLE 10

| Parameter | Required | Default Value | Notes |
| --- | --- | --- | --- |
| Object ID | Yes | — | Indicates the object. |
| Object Instance ID | No | — | Indicates the object instance to create. If this resource is not specified, the client assigns the ID of the object instance, which has not been used. |
| New Value | Yes | — | The new value included in the payload to create the object instance. |

Delete

"Delete" operation is used for the M2M server to delete an object instance in the M2M client. The object instance deleted from the M2M client by the M2M server should be an object instance that is notified to the M2M server by the M2M client using "Register" and "Update" operations of the device registration interface. "Delete" operation has the following parameters.

TABLE 11

| Parameter | Required | Default Value | Notes |
| --- | --- | --- | --- |
| Object ID | Yes | — | Indicates the object. |
| Object Instance ID | Yes | — | Indicates the object instance to delete. |

Observe

The M2M server can initiate observation request for changes in a specific resource in the M2M client, resources in an object instance or all object instances of an object. Related parameters for "Observe" operation are set by "Write Attributes" operations. "Observe" operation includes the following parameters.

TABLE 12

| Parameter | Required | Default Value | Notes |
| --- | --- | --- | --- |
| Object ID | Yes | — | Indicates the object. |
| Object Instance ID | No | — | Indicates the object instance to observe. If no object instance ID is indicated, then all the object instances of objects are observed and resource ID must not be specified. |
| Resource ID | No | — | Indicates the resource to observe. If no resource ID is indicated, then the whole object instance is observed. |

Cancel Observe

"Cancel Observe" operation is transmitted from the M2M server to the M2M client to cancel observation for an object instance or a resource. "Cancel Observe" operation has the following parameters.

TABLE 13

| Parameter | Required | Default Value | Notes |
| --- | --- | --- | --- |
| Object ID | Yes | — | Indicates the object. |
| Object Instance ID | No | — | Indicates the object instance to stop observing. If no object instance ID is indicated, then object ID is indicated and resource ID must not be specified. |
| Resource ID | No | — | Indicates the resource to stop observing. If no resource ID is indicated, then the whole object instance is indicated. |

Access Control Method

A description will be given of an access control method according to another embodiment of the present invention.

Access Right Acquisition

When the M2M client has an M2M server object instance, the M2M client has the rights to access corresponding resources without undergoing access control for the corresponding single M2M server, that is, without checking the access control object instance.

If the M2M client has two or more M2M server object instances, then the M2M client finds the ACL of a corresponding server with respect to an object instance to be accessed or an object instance including a resource to be accessed in access control object instances. If the ACL includes the access right corresponding to the corresponding M2M server ID, then the corresponding M2M server has the access right. If the ACL entry of the corresponding M2M server ID is not present, the M2M client checks whether the ACL includes access right allocated to a default server ID. When the default server ID is present, the corresponding M2M server has access right of the default server ID. When the access right corresponding to the M2M server ID and the access right of the default server ID are not present, the corresponding M2M server does not have the right to access the corresponding object instance or resource.

Access Control Object

An access control object is used to check whether an M2M server has the access right to perform operations. Each access control object instance includes an ACL for a specific object instance in the M2M client.

TABLE 14

| Resource Name | Resource ID | Supported Operations | Multiple Instances? | Mandatory? | Data Type | Range or Enumeration | Units | Descriptions |
|---|---|---|---|---|---|---|---|---|
| Object ID | 0 | R | Single | Mandatory | Integer | 1-65534 | — | The Object ID and the Object Instance ID are applied for LWM2M identifiers. |
| Object Instance ID | 1 | R | Single | Mandatory | Integer | 1-65535 | — | |
| ACL | 2 | R, W | Multiple | Optional | Integer | 8-bit | — | Resource instance ID must be the short server ID of a certain LWM2M server which has an access right. Resource instance ID 0 is for default short server ID. Setting each bit means the LWM2M server has the access right for that operation. The bit order is specified as below. $1^{st}$ lsb: Read, Observe, Discover, Write Attributes $2^{nd}$ lsb: Write $3^{rd}$ lsb: Execute $4^{th}$ lsb: Create $5^{th}$ lsb: Delete Other bits are reserved for future use |
| Access Control Owner | 3 | R, W | Single | Mandatory | Integer | 1-65365 | — | Short server ID of a certain LWM2M server. Only this LWM2M server can manage these resources of the object instance. Value MAX_INTEGER = 0xFFFF is reserved for the access control object instances created during bootstrap procedure. |

Authentication Procedure

To pass an authentication procedure for an operation transmitted from an M2M server, the following needs to be satisfied. First, the M2M server needs to have the right (i.e. access right) to perform the operation transmitted for a corresponding resource (e.g. object instance or resource). Secondly, the corresponding resource needs to support the transmitted operation. An access right authentication procedure according to an embodiment of the present invention is performed through two steps, that is, in a hierarchical structure.

The M2M client notifies the M2M server that the transmitted operation is not performed due to a certain resource by transmitting an error message to the M2M server when the right to access the corresponding resource is not present and by transmitting information about the corresponding resource to the M2M server when the corresponding resource does not support the operation. The authentication procedure is differently performed for three levels, that is, a resource, an object instance and an object.

Operation for a Resource

If the M2M server accesses an individual resource, that is, the M2M server transmits an operation with respect to the individual resource to the M2M client, then the M2M client can acquire the access right of the M2M server for an object instance including the individual resource according to the aforementioned access right acquisition method and check whether the access right is granted to perform the operation.

When the operation is not granted, the M2M client needs to transmit an error code indicating "grant of access right is rejected" to the M2M server.

When the operation is granted, the M2M client verifies whether the individual resource supports the operation.

If the operation is not supported by the individual resource, then the M2M client needs to transmit an error code indicating "operation is not supported" to the M2M server.

When the operation is supported by the individual resource, the M2M client can perform the operation.

Operation for an Object Instance

When the M2M server accesses an object instance, that is, the M2M server transmits an operation with respect to the object instance to the M2M client, the M2M client can acquire the access right of the M2M server for the object instance according to the aforementioned access right acquisition method and check whether the access right is granted to perform the operation.

When the operation is not granted, the M2M client needs to transmit an error code indicating "grant of access right is rejected" to the M2M server.

When the operation is granted, the M2M client can perform the following processes based on the operation.

For "Write" operation, the M2M client can perform the operation with respect to the object instance only when all resources with respect to the transmitted operation support "Write" operation. If any resource (with respect to the transmitted operation) does not support "Write" operation, then the M2M client can notify the M2M server of resources that do not support the operation by transmitting an error code indicating "operation is not supported" to the M2M server.

For "Read" operation, the M2M client can retrieve all resources other than resources that do not support "Read" operation and transmit information about the retrieved resources to the M2M server.

For "Create" operation, the M2M client can perform the operation with respect to the object instance only when all resources with respect to the transmitted operation support "Write" operation and all mandatory resources are specified. If any resource (with respect to the transmitted operation) does not support "Write" operation, then the M2M client can transmit an error code indicating "operation is not supported to the M2M server to notify the M2M server of resources that do not support the operation. When all mandatory resources are not specified, the M2M client can transmit error code "Bad Request" to the M2M server.

For "Delete", "Observe", "Write Attribute" or "Discover" operation, the M2M client needs to perform the operation. That is, the M2M client needs to perform "Delete", "Observe", "Write Attribute" or "Discover" operation without checking whether the operation with respect to the object instance is supported by all resources belonging to the object instance.

For an operation other than the aforementioned operations, the M2M client need not perform the operation and needs to transmit an error code of "operation is not supported" to the M2M server.

Whether the M2M server has the access right for the object instance is determined through the aforementioned access right acquisition method. Then, whether individual resources belonging to the object instance support the operation is checked. This process is performed depending upon the operation type.

Operation for an Object

Operations for objects are defined according to operation type.

When the M2M server transmits "Read" operation through an object, that is, the M2M server transmits "Read" operation with respect to the object to the M2M client, the M2M client can collect information on object instances for which the M2M server has the access right from among (lower) object instances belonging to the object and transmit the collected information to the M2M server. Whether the M2M server has the access right is determined according to the aforementioned access right acquisition method.

The information on the object instances for which the M2M server has the access right refers to information on resources searched by the M2M client except for resources that do not support "Read" operation.

When the M2M server transmits "Create" operation through an object, that is, the M2M server transmits "Create" operation with respect to the object to the M2M client, the M2M client can check whether the M2M server has the access right for the object according to the aforementioned access right acquisition method.

When the M2M server has the access right for the object, the M2M client can perform the operation only when all resources transmitted according to the operation support "Write" operation and all mandatory resources are specified. If any resource (with respect to the transmitted operation) does not support "Write" operation, the M2M client can notify the M2M server of resources that do not support the operation by transmitting error code of "operation is not supported" to the M2M server. If all mandatory resources are not specified, the M2M client can transmit error code "Bad Request" to the M2M server. That is, the M2M client notifies the M2M server that the operation according to the M2M server is incorrect.

In the case of "Discover" operation, the M2M client needs to perform the operation. That is, the M2M client does not check whether the M2M server has the access right for all lower object instances of the corresponding object and does not check whether all resources belonging to the object instances support "Discover" operation.

In the case of "Observe" or "Write Attributes" operation, the M2M client needs to perform the operation. That is, for "Observe" or "Write Attributes" operation, the M2M client does not check whether the M2M server has the access right for all lower object instances of the object and whether all resources belonging to the object instances support "Observe" or "Write Attributes" operation.

For an operation other than the aforementioned operations, the M2M client should not perform the operation and can transmit an error code of "operation is not supported" to the M2M server.

Whether the M2M server has the access right for the object is determined through the aforementioned access right acquisition method according to a specific operation for the object. Then, whether individual resources belonging to object instances of the object support the operation is checked. This process is performed depending upon the operation type. For a specific operation with respect to the object, whether the M2M server has the access right and whether the specific operation is supported may not be checked.

Initialization in Re-Bootstrap

Conventional re-bootstrap for a specific M2M server literally refers to regeneration of bootstrap. When bootstrap is regenerated, previous information about an M2M server is deleted and the content of an account of the M2M server is transmitted through bootstrap. In this case, information regarding the M2M server, for example, ACL, is deleted and information about the M2M server is initialized, and thus the M2M server cannot access any resource although the M2M server is connected prior to allocation of the ACL.

Provision of Full Information During Re-Bootstrap

When bootstrap is generated during re-bootstrap, the same information as bootstrap information needs to be provided to an M2M client. In the case of re-bootstrap, however, all bootstrap information need not be provided since previous bootstrap information is changed. That is, if provision of partial information is permitted, data overhead can be reduced.

Bootstrap Information

Bootstrap information is information transmitted through an M2M bootstrap server and is necessary for an M2M client to be connected/communicate with an M2M server or the M2M bootstrap server. The bootstrap information can be transmitted through a bootstrap interface and can be used prior to a bootstrap sequence or obtained as a result of the bootstrap sequence.

The bootstrap information is classified into M2M server bootstrap information and M2M bootstrap server bootstrap information. The M2M server bootstrap information includes an M2M server account and optional object instances (e.g., an access control object instance and a network connectivity object instance), and the M2M bootstrap server bootstrap information includes an M2M bootstrap server account.

The M2M server account may store information necessary to connect to the M2M server, server related functions and information regarding server related functions. The M2M bootstrap server account stores information necessary to connect to the M2M bootstrap server.

The M2M client trusts and receives a bootstrap message that satisfies security requirements of the M2M server (e.g., data confidentiality, data integrity and source authentication) or information provided through the bootstrap interface.

Server Information

For communication between an M2M client and an M2M server, basic information and additional information (information transmitted through bootstrap) necessary for communication with the M2M server need to be provided through the M2M bootstrap server. Examples of such information include a server ID, a server address (e.g., IP, URI or the like), security credential, network bearer information, preferred network bearer information, resources that can be generated by the M2M server and the like. Specific M2M server (related) bootstrap information may refer to the server information.

Access Control Information

To access a specific resource of the M2M client, the M2M server needs to have rights to access the resource. Access control related information (i.e., an access control list (ACL) or resources including the ACL) can be changed through bootstrap. Corresponding information may be provided or not through bootstrapping.

Re-Bootstrap

When a problem is generated during communication between an M2M client and an M2M server based on bootstrap information through bootstrap or resources (e.g. read-only resources) that cannot be changed through the communication are present, re-bootstrap is used to solve the problem or to change the resources. The bootstrap information has been present in the M2M client through previous bootstrap. In this case, re-bootstrap can operate differently from previous or initial bootstrap to improve efficiency.

Partial Re-Bootstrap

During re-bootstrap, full bootstrap information is not provided and part of the bootstrap information is changed on the basis of previous information. In this case, the quantity of bootstrap information transmitted by a bootstrap server during re-bootstrap can be reduced and thus network data overhead can be decreased.

Partial re-bootstrap can be determined through bootstrap information (including only information to be updated) in a re-bootstrap message. Partial re-bootstrap may be enabled through an indicator that indicates information to be changed from among bootstrap information of re-bootstrap.

The bootstrap server, which is a logical entity that executes a bootstrapping function only, may be physically the same as a specific M2M server.

Initialization Option

In conventional bootstrapping, an M2M client deletes M2M server related information (e.g., ACL) as well as server information included in previous bootstrap information and then performs bootstrap. Accordingly, since the M2M server related information cannot be maintained in the M2M client, the M2M server needs to additionally store the M2M server related information through a method such as backup or the like and additionally provide the information after bootstrapping. To solve this problem, an initialization option is provided during bootstrapping and the M2M server related information is deleted only when the initialization option is set. In this case, when only partial information needs to be updated through re-bootstrap, initialization is not performed so as to enable more convenient re-bootstrap.

Re-Bootstrap Recognition

An M2M client can recognize that a message received on the basis of information (e.g. account information of a specific server) stored in the M2M client is a re-bootstrap message through a parameter indicating re-bootstrap, which is included in the re-bootstrap message or a previous bootstrap message.

Bootstrap (Re-Bootstrap) Message Based Information Storage

A bootstrap message can include a position (or address) of information to be actually updated. In this case, an M2M client stores the corresponding information at the corresponding position. The bootstrap message can include information through which actually updated information can be inferred. For example, the bootstrap message can include a value indicating one unique object instance such that the M2M client can update the object instance having the value.

Access control related information, such as an object that can be generated, can be stored in an access control object (instance) after change of information transmitted through the bootstrap message in order to collect access control information at one place.

Re-Bootstrap Type #1

Full Re-Bootstrap

When full re-bootstrap with respect to a specific M2M server occurs, an M2M client changes entire bootstrap information of the M2M server. Full bootstrap or partial bootstrap is determined according to a parameter of re-bootstrapping or information present in a re-bootstrap message.

In the case of full bootstrap, it is possible to select whether to initialize the bootstrap information of the M2M server or update only the bootstrap information. In the case of initialization of the bootstrap information, previous bootstrap information of the corresponding M2M server is all deleted. In addition, information (e.g. an ACL) regarding the M2M server, which is not included in bootstrap information present in the M2M client, is also deleted. Then, bootstrap is performed according to re-bootstrap information. That is, the M2M client completely deletes information of the corresponding M2M server, which is present therein, and initializes information of the M2M server as if the M2M server newly performs bootstrap. When the M2M client updates the information instead of initializing the information, the M2M client updates only corresponding bootstrap information (information regarding the M2M server is maintained instead of being deleted).

Partial Re-Bootstrap

When partial re-bootstrap with respect to a specific M2M server occurs, an M2M client changes only part of previous bootstrap information of the specific M2M server. Full bootstrap or partial bootstrap is determined according to a parameter of re-bootstrapping or information present in a re-bootstrap message. A changed part of the previous bootstrap information is determined according to a parameter of re-bootstrapping or information included in a re-bootstrap message. That is, in the case of partial re-bootstrap, only part of the entire bootstrap information can be changed or updated. Furthermore, information (e.g., ACL) regarding the M2M server is not deleted. Accordingly, it is possible to change only specific bootstrap information of the M2M server while maintaining information regarding the M2M server. Partial re-bootstrap has an advantage of enabling bootstrap while maintaining bootstrap information related to the M2M server.

To maintain bootstrap information related to the M2M server, specific information (e.g., server URI, short server ID or the like), such as information used to identify the specific M2M server, in re-bootstrapped bootstrap information need not be changed.

Re-Bootstrap Flow

Figure 4:
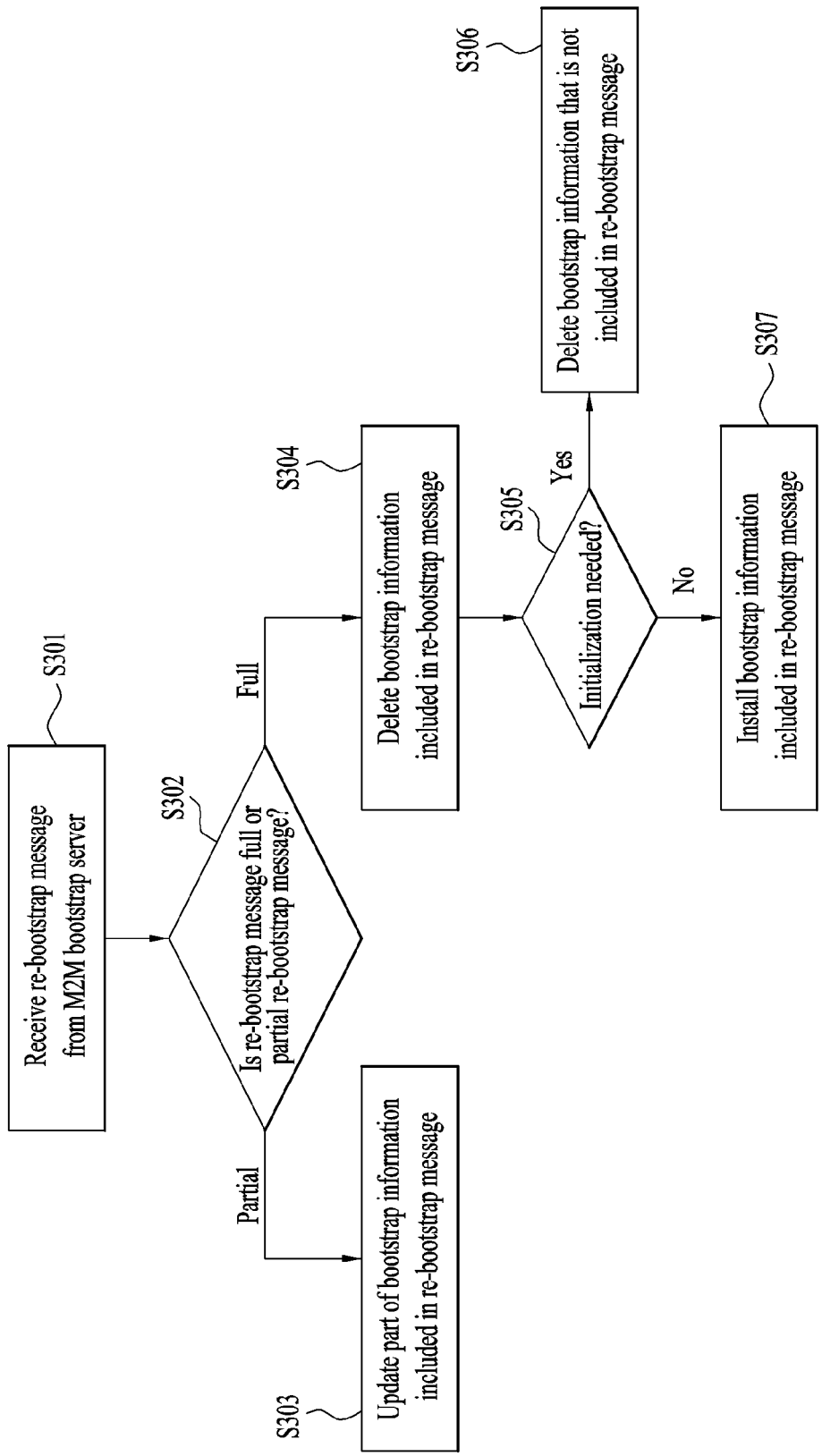
FIG. 4 is a flowchart illustrating a method for updating information according to an embodiment of the present invention.

FIG. 4 is a flowchart illustrating a full re-bootstrap procedure according to an embodiment of the present invention.

An M2M client may receive an M2M server bootstrap message (S301). The M2M client may receive a re-bootstrap message from the corresponding M2M server and, when the re-bootstrap message includes information indicating re-bootstrap or previous M2M server account information, recognize re-bootstrapping through the information.

The M2M client may determine whether the re-bootstrap message is a full re-bootstrap message or a partial re-bootstrap message (S302). The M2M client may check whether the re-bootstrap message is for change of entire bootstrap information related to the M2M server or for change of part thereof.

The M2M client may update part of the M2M server related bootstrap information, which is included in the re-bootstrap message and present in the M2M client (S303). The M2M client may change part of the M2M server related bootstrap information. When the M2M client changes part of the M2M server related bootstrap information, the M2M client may directly change part of the information to information included in the re-bootstrap message or change only specific information indicated by a parameter, from among the information included in the re-bootstrap information.

When the re-bootstrap is related to full bootstrap information, the M2M client may delete the M2M server related bootstrap information, which is included in the re-bootstrap message and present in the M2M client (S304).

Subsequently, the M2M client may check whether initialization is needed (S305). Initialization may be indicated by a parameter included in re-bootstrap information or set by default.

The M2M client may delete the M2M server related bootstrap information present in the M2M client, which is not included in the re-bootstrap message (S306).

Then, the M2M client may install (generate or write) the M2M server related bootstrap information included in the re-bootstrap message (S307).

S304 and S307 may be unified to update bootstrap information simultaneously. After re-bootstrapping, connection with an M2M server may occur.

Re-Bootstrap Type #2

Figure 5:
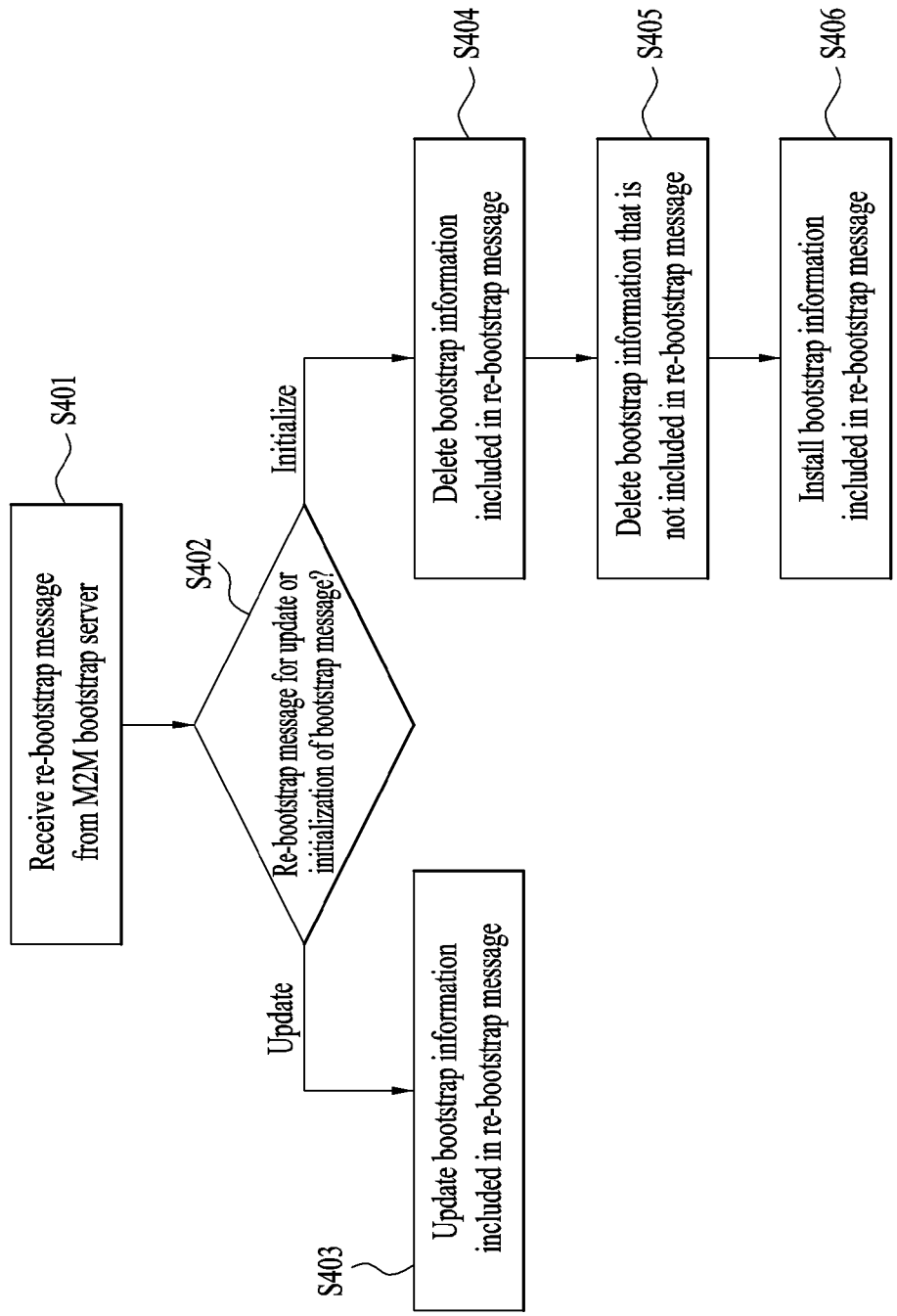
FIG. 5 is a flowchart illustrating a method for updating information according to an embodiment of the present invention.

FIG. 5 is a flowchart illustrating re-bootstrapping according to an embodiment of the present invention.

Initialization Re-Bootstrap

Initialization re-bootstrap refers to a procedure through which an M2M client deletes entire bootstrap information related to an M2M server and provides bootstrap information (i.e., server account or other bootstrap information) of the M2M server.

Re-Bootstrapping of Bootstrap Information

In the case of re-bootstrapping of bootstrap information, the M2M client can update only bootstrap information (i.e., server account or other bootstrap information) of the M2M server. To maintain the M2M server related bootstrap information, specific information (e.g., server URI, short server ID or the like), such as information used to identify the specific M2M server, in the re-bootstrapped bootstrap information need not be changed. When the bootstrap information includes only server account information, only the server account is updated through re-bootstrapping.

Re-Bootstrap Flow

The M2M client may receive a re-bootstrap message for re-bootstrapping related to the M2M server (S401). The M2M client may receive the re-bootstrap message from the M2M server. The re-bootstrap message can indicate re-bootstrapping by including information indicating re-bootstrap. When the re-bootstrap message includes M2M server related account information previously present therein, the M2M client can recognize re-bootstrapping through the information.

The M2M client may determine whether the re-bootstrap message is for update of bootstrap information or initialization of the bootstrap information (S402).

When the re-bootstrap message is for update of the bootstrap information, the M2M client may update M2M server related bootstrap information present in the M2M client, which is included in the bootstrap message (S403).

The M2M client may change the M2M server related bootstrap information. Here, the M2M client can directly change the M2M server related bootstrap information to information included in the re-bootstrap message or change only specific information specified by a parameter, from among the information included in the re-bootstrap information.

When the re-bootstrap message is for initialization re-bootstrap, the M2M client may delete the M2M server related bootstrap information present therein, which is included in the re-bootstrap message (S404).

Subsequently, the M2M client may delete M2M server related bootstrap information present therein, which is not included in the re-bootstrap message (S405).

Then, the M2M client may generate the M2M server related bootstrap information included in the re-bootstrap message (S406).

S404 and S406 may be unified to update bootstrap information simultaneously. Furthermore, registration may occur after re-bootstrapping.

Re-Bootstrap Type #3

Figure 6:
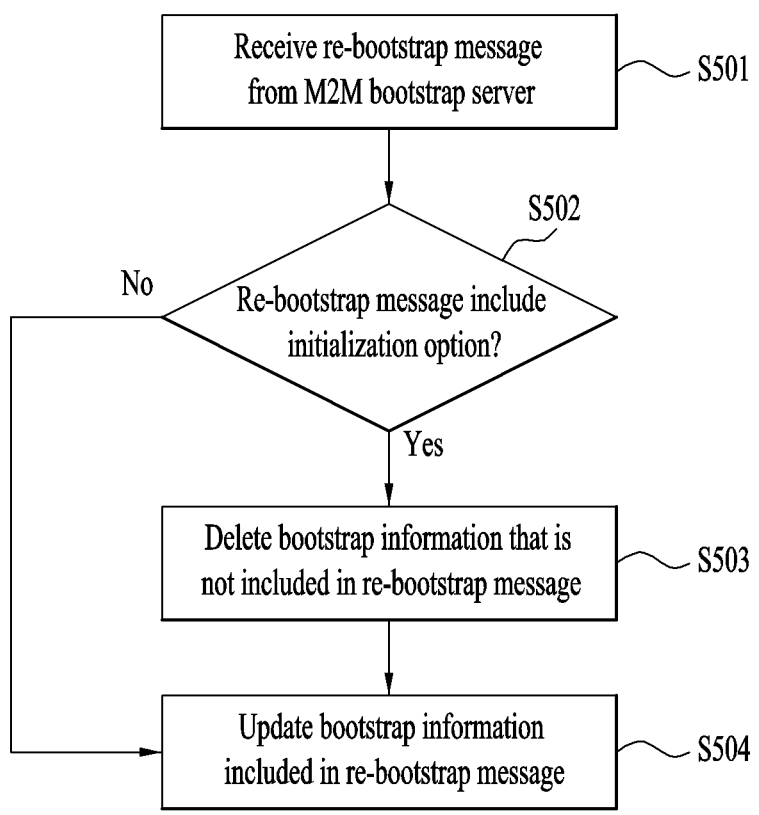
FIG. 6 is a flowchart illustrating a method for updating information according to an embodiment of the present invention.

FIG. 6 is a flowchart illustrating re-bootstrapping according to an embodiment of the present invention.

The M2M client may receive a re-bootstrap message related to the M2M server (S501). The M2M client may receive a bootstrap message (referred to as "re-bootstrap message" hereinafter) for re-bootstrap from the specific M2M server. The re-bootstrap message can indicate re-bootstrapping by including information indicating re-bootstrap. When the re-bootstrap message includes M2M server related account information previously present therein, the M2M client can recognize re-bootstrapping through the information.

The M2M client may check whether the re-bootstrap message includes initialization option (S502).

When the re-bootstrap message includes initialization option, the M2M client may delete the M2M server related bootstrap information (e.g., ACL) present therein, which is not included in the re-bootstrap message (S503).

Then, the M2M client may update the M2M server related bootstrap information present therein, which is included in the re-bootstrap message, irrespective of the initialization option (S504). The M2M client may change the bootstrap information of the M2M server.

When the M2M client changes the bootstrap information, the M2M client may directly change the bootstrap information to information included in the re-bootstrap message or change only specific information specified by a parameter, from among the information included in the re-bootstrap information.

Re-Bootstrap Type #4

The M2M client or the M2M server may update all or part of the bootstrap information through bootstrap. That is, the M2M bootstrap server can provide full bootstrap information through a plurality of write operation instructions and update only part of the bootstrap information through a plurality of write operation instructions or one write operation instruction.

In a conventional method, the entire bootstrap information needs to be updated because the bootstrap information provides only information and a client determines where to write the information. That is, the bootstrap information is only provided to the client and the M2M server or M2M bootstrap server needs to find out where to write or store the bootstrap information by the client through an additional query.

However, if the bootstrap server can determine where to store or write the bootstrap information from a bootstrapping step to a re-bootstrapping step, the bootstrap server can only transmit a write operation instruction including the address of the corresponding bootstrap information. That is, if the M2M bootstrap server can be aware of a region of the M2M client, in which the bootstrap information is stored, in the re-bootstrapping step, the bootstrap information can be updated through the address thereof.

Update Method

In an M2M system, the M2M server can access a specific resource using a specific operation instruction (e.g., create/read/write/delete and the like) to the M2M client through a device management and service enablement interface. Whether to execute operation instructions is determined through access control. That is, when the M2M server cannot modify the specific resource, the corresponding operation instruction is filtered in the access control step and is not executed. However, since the M2M server that performs bootstrapping, that is, the bootstrap server is a very special and reliable entity, all operation instructions received from the bootstrap server are accepted by the M2M client without passing through the access control step.

The bootstrap server and the M2M client can perform all or some operations of creating, reading, modifying and deleting resources through a bootstrap interface connected thereto. However, in communication with the bootstrap server, creation and modification of resources can be performed through one operation instruction in order to reduce restrictions thereon. That is, the M2M server can create or modify resources through one operation instruction according to an embodiment of the present invention. Upon reception of one operation instruction, the M2M client can create a resource corresponding to the operation instruction if the resource is not present and modify the resource when the resource is present. This can be easily used when the bootstrap server has no resource reading method since presence or absence of the resource is checked and the resource can be directly accessed without changing the operation instruction. In addition, since the bootstrap server is a very special and reliable entity, processing complexity or data overhead can be reduced by not considering unnecessary access control or restrictions.

Specifically, upon reception of the operation instruction through the device management and service enablement interface, the M2M client checks whether the operation instruction is valid prior to execution thereof. Accordingly, when the operation instruction designates a non-existent resource, for example, when a write operation instruction indicates a specific resource (e.g., A/B/C), the operation instruction targets a non-existent object if the specific resource is not present in the M2M client, and thus the M2M client is configured to transmit a response indicating that the operation instruction designates the wrong target to the M2M server.

However, according to an embodiment of the present invention, the M2M client is configured to execute the operation instruction irrespective of presence of the target indicated by the operation instruction, upon reception of the operation instruction through a bootstrap interface. That is, even though the operation instruction is not executed due to errors when received through the device management and service enablement interface, the M2M client is configured to execute the operation command without considering the errors when the operation instruction is received through the bootstrap interface.

Re-Bootstrap

When Re-Bootstrap Occurs?

Re-bootstrapping is performed when bootstrap information needs to be updated after initial bootstrap or in order to update read-only resources/configuration of the M2M client.

Bootstrap

Bootstrap Operation Instructions

Operation instructions (or commands or methods) used for bootstrap may be the same as operation instructions (e.g., create/delete/read/write/write attributes/discover and the like) used to manipulate actual resources in normal operations (device management and service enablement interface in lightweight M2M), and some (e.g., write/delete/read) of the operation instructions may be restrictively used.

Authentication

Since operation instructions transmitted through a bootstrap message or a bootstrap interface are transmitted from a reliable bootstrap server (lightweight M2M bootstrap server in lightweight M2M), a client (lightweight M2M client in lightweight M2M) executes the operation instructions transmitted through the corresponding bootstrap message or bootstrap interface without performing an authentication procedure (e.g., access control) used in conventional normal operations (device management and service enablement interface in lightweight M2M) or upon determining that the operation instructions have passed the authentication procedure.

In the authentication procedure used in conventional normal operations, instructions may be executed or not according to whether the instructions are supported by resources. That is, when a specific resource supports only a read operation instruction, if a server transmits a write operation instruction for the specific resource to a client, the client cannot execute the operation command and transmits a failure result to the server. However, operation instructions transmitted through the bootstrap are executed irrespective of whether the operation instructions are supported by resources. That is, even when a write operation instruction for a resource that supports only a read operation instruction is transmitted from the server, the client is configured to execute the operation instruction. In this case, the read or write operation instruction needs to be permitted for the resource through the bootstrap interface.

Bootstrap Information Initialization

When bootstrap information present in a client is not recognized or all resources need to be initialized, the bootstrap server can initialize bootstrap information. The bootstrap server can delete all resources (or information except for a bootstrap server account, information except for the bootstrap server account and M2M server account, information except for a bootstrap server credential account, or information except for bootstrap and server credential accounts) present in the client through corresponding instructions. Thereafter, the bootstrap server can transmit new bootstrap information to the client. Initialization can be performed by transmitting a delete or write operation instruction (including a bin value) to a specific position (e.g., "/") of the client. The accounts may be the same as object instances.

Bootstrap Information Transmission

Bootstrap information may be transmitted through one message or multiple messages. Multiple messages can be respectively matched to operation instructions and transmitted.

Operation Instruction Optimization

The bootstrap server can execute multiple operation instruction functions through one operation instruction for bootstrap. That is, "create" or "write" can be performed through one write operation instruction when bootstrap information cannot be recognized through the bootstrap interface or for convenience of the bootstrap interface. In transmission of a write operation instruction for a specific resource of the client, when the specific resource is not present, the resource is created through the write operation instruction. When the resource is present, the resource is updated through the write operation instruction.

A detailed description will be given of a bootstrap interface according to an embodiment of the present invention.

The bootstrap interface is used to provide essential information to the M2M client to enable the M2M client to execute a "register" operation instruction with one or more M2M servers. There are four bootstrap modes supported by an M2M enabler.

Factory bootstrap: Bootstrap information is preset in an M2M client.

Bootstrap from a smartcard: The M2M client receives bootstrap information from a smartcard.

Client initiated bootstrap: The M2M client requests bootstrap to the M2M bootstrap server and the M2M bootstrap server adds/deletes/updates bootstrap information of the M2M client.

Server initiated bootstrap: The M2M bootstrap server adds/deletes/updates the bootstrap information of the M2M client.

The M2M client can support at least one bootstrap mode specified in the bootstrap interface. The M2M server can support all bootstrap modes specified in the bootstrap interface.

Bootstrap information refers to information that needs to be configured in an M2M client to access the M2M server or the M2M bootstrap server. The bootstrap information can be used prior to a bootstrap sequence or acquired as a result of the bootstrap sequence. The bootstrap information can be classified into two types, that is, bootstrap information for the M2M server and bootstrap information for the M2M bootstrap server.

The M2M client can have bootstrap information (e.g., information necessary for connection with the M2M server) for the M2M server after the bootstrap sequence. In addition, the M2M client can have bootstrap information (e.g., information necessary for connection with the M2M bootstrap server) for the M2M bootstrap server. The bootstrap information for the M2M server is used for the M2M client to register and connect with the M2M server.

The bootstrap information for the M2M server can include at least an M2M server security object instance in which a "bootstrap server" resource is set to "false". The bootstrap information for the M2M server can include other object instances.

The M2M client can be configured to use two or more M2M servers including a set of bootstrap information for the respective M2M servers. The bootstrap information for the M2M bootstrap server can be used by the M2M client to access M2M bootstrap information for obtaining the bootstrap information for the M2M server. The bootstrap information for the M2M bootstrap server may be an M2M server security object instance in which the "bootstrap server" resource is set to "true".

Bootstrap information can be classified as follows.

TABLE 15

| Bootstrap Information Type | Entity | Required |
|---|---|---|
| LWM2M Server Bootstrap Information | LWM2M Server Account | Yes (M2M client needs to have at least one M2M server account after bootstrap sequence.) |
|  | Additional Object Instances (e.g., Access Control, Connectivity Object) | No |
| LWM2M Bootstrap Server Bootstrap Information | LWM2M Bootstrap Server Account | No |

The M2M client can accept bootstrap information transmitted through the bootstrap interface without an authentication procedure (access control).

The bootstrap interface selectively sets an M2M client such that the M2M client is successfully registered with the M2M server or connected with the M2M bootstrap server. A client bootstrap operation instruction is executed by transmitting a CoAP POST request with a query string parameter including an M2M client identifier through /bs path of the M2M bootstrap server.

When the M2M bootstrap server receives a request bootstrap operation instruction in client initiated bootstrap, the M2M bootstrap server can execute write and/or delete operation instructions. In server initiated bootstrap, the M2M bootstrap server can execute a write operation instruction. Write and/or delete operation instructions can target an object instance or resource. The write and/or delete operation instructions can be transmitted multiple times. Only in the bootstrap interface, a delete operation instruction can target "/" URI in order to delete all object instances except the M2M bootstrap server account from the M2M client for initialization of the M2M client before the M2M bootstrap server transmits write operation instructions to the M2M client. Distinguished from a write operation instruction in the device management and service enablement interface, the M2M client can write a payload of the operation instruction (i.e., a specific value intended to be written by the write operation instruction) irrespective of presence of a targeted object instance or resource. Operation instructions in the bootstrap interface are shown in the following. The write operation instruction can be replaced by another operation instruction (e.g., create).

TABLE 16

| Logical Operation | CoAP Method | URI | Success | Failure |
| --- | --- | --- | --- | --- |
| Request Bootstrap | POST | /bs?ep={Endpoint Client Name} | 2.04 Changed | 4.00 Bad Request |
| Write | PUT | /{Object ID}/{Object Instance ID}/{Resource ID} | 2.04 Changed | 4.00 Bad Request |
| Delete | DELETE | /{Object ID}/{Object Instance ID}/{Resource ID} | 2.02 Deleted | 4.00 Bad Request |

Bootstrap Sequence

The M2M client must follow the bootstrap sequence (step) specified as below when attempting to bootstrap an M2M device.

If the M2M device has a smartcard, the M2M client tries to obtain bootstrap information from the smartcard.

If the M2M client is not configured using the bootstrap from smartcard mode, the M2M client tries to obtain the bootstrap information by using factory bootstrap mode.

If the M2M client has any M2M server object instances through the previous steps, the M2M client requests registration with an M2M server corresponding to the M2M server object instance.

When the M2M client fails to register with all M2M servers or does not have any M2M server object instance, the M2M client waits for server initiated bootstrap for a time ClientHoldOffTime specified by a specific resource and, when the server initiated bootstrap is not generated within the time, attempts to obtain bootstrap information through a client initiated bootstrap.

Client Initiated Bootstrap

An M2M server account may not be set (present) in the M2M client or an attempt to execute a "register" operation instruction with an M2M server may fail. In this case, the M2M client can use the client-initiated bootstrap mode in order to retrieve bootstrap information from the M2M bootstrap server. The client-initiated bootstrap mode can request an M2M security server object instance indicating (referring to) the M2M bootstrap server to be set (present) in the M2M client.

Figure 7:
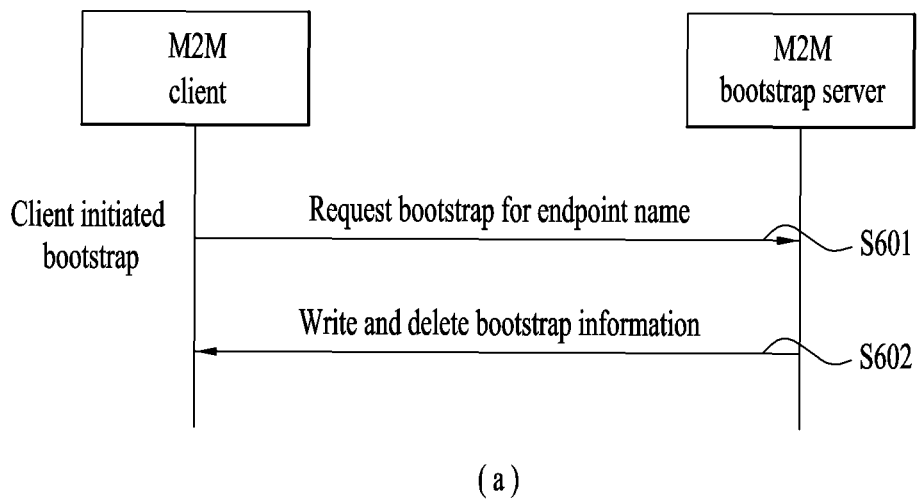
FIG. 7 is a block diagram of a method for updating information according to an embodiment of the present invention.
Figure 7:
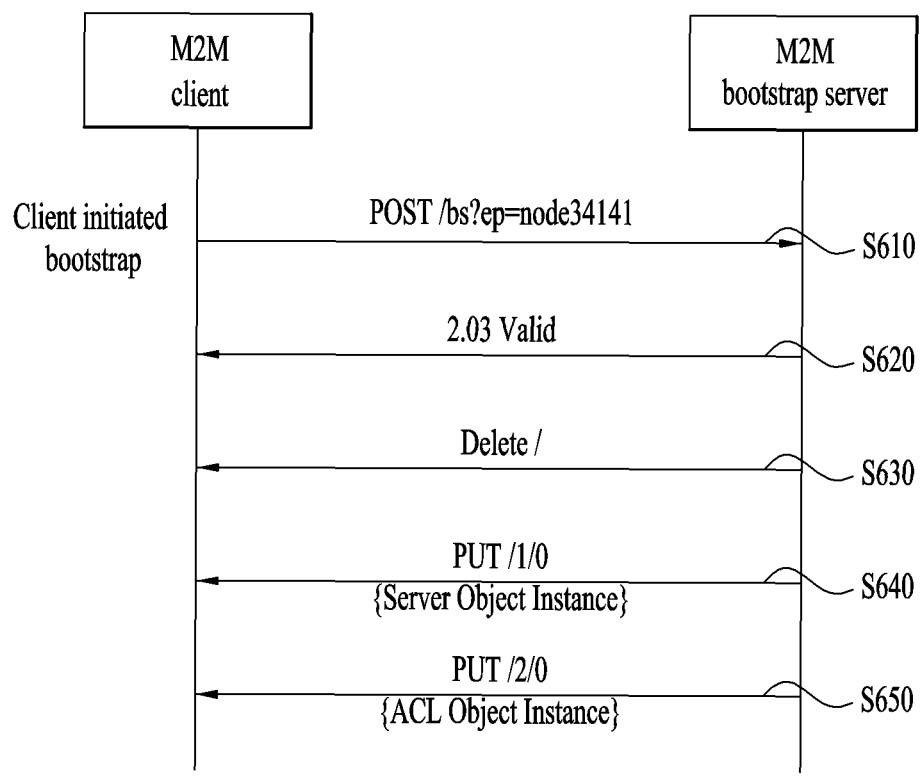

FIG. 7 illustrates a client-initiated bootstrap mode operation according to an embodiment of the present invention. The M2M client can transmit a "bootstrap request" operation instruction to a pre-provisioned M2M bootstrap server URI (S601). When the M2M client requests bootstrap, the M2M client can transmit "endpoint client name" (M2M client identifier) of the M2M client as a parameter to enable the M2M bootstrap server to provide appropriate bootstrap information for the M2M client.

The M2M bootstrap server can set (or configure) bootstrap information to the M2M client using "write" and/or "delete" operation instructions (S602).

The client-initiated bootstrap can be used to set some resources of the bootstrap information of the M2M client in order to update bootstrap information after the initial bootstrap. As an example, bootstrap information is optional and thus may be transmitted or not.

Server Initiated Bootstrap

In the case of server initiated bootstrap, the M2M client does not transmit a bootstrap request to the M2M bootstrap server and the M2M bootstrap server sets bootstrap information in the M2M client. Since the M2M client does not initiate "bootstrap request" operation instruction to the M2M bootstrap server, the M2M bootstrap server needs to know whether the M2M client or M2M device is ready to bootstrap before the M2M client is set by the M2M bootstrap server. The present invention does not provide a mechanism by which the M2M bootstrap server obtains such information. As an example, when the M2M device is connected to a network of a network provider, a scenario in which the network of the network provider informs the M2M bootstrap server of whether the M2M device is ready to bootstrap is possible.

When the M2M bootstrap server is notified that the M2M device is ready to receive the bootstrap information, the M2M bootstrap server can set the bootstrap information in the M2M client using "write" and/or "delete" operation instructions.

Figure 8:
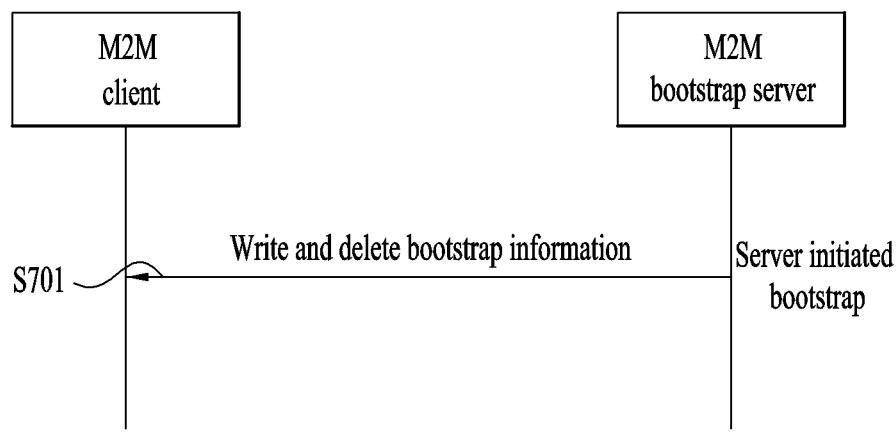
FIG. 8 is a block diagram of a method for updating information according to an embodiment of the present invention.
Figure 8:
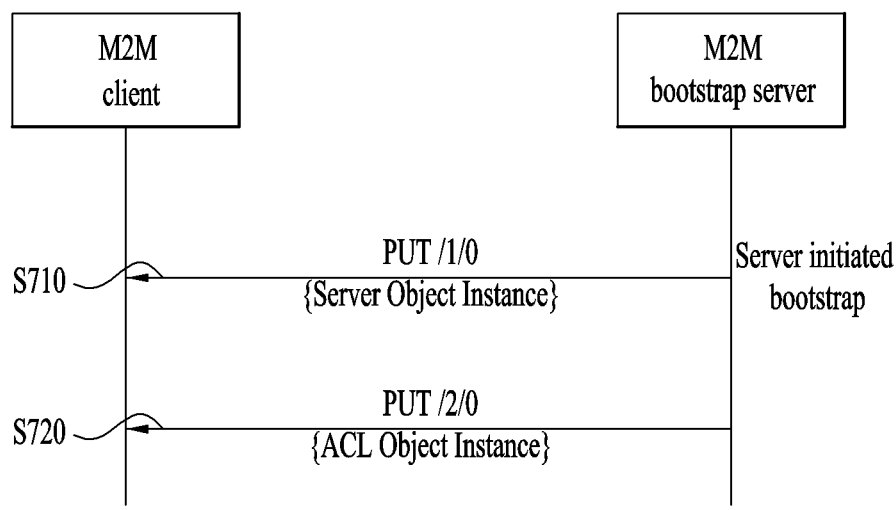

FIG. 8 illustrates a server-initiated bootstrap mode operation according to an embodiment of the present invention. The M2M bootstrap server can set the bootstrap information in the M2M client using "write" and/or "delete" operation instructions (S701).

The server-initiated bootstrap can be used to set some resources of the bootstrap information of the M2M client in order to update bootstrap information after initial bootstrap. In this example, bootstrap information is optional and thus may be transmitted or not.

Re-bootstrapping can be performed as follows according to the aforementioned bootstrap modes.

Re-Bootstrapping Procedure

Preset Re-Bootstrap

"A preset re-bootstrap" procedure is performed when bootstrap information is prestored in the M2M client. Here, the M2M server or the M2M bootstrap server can include parameters indicating a re-bootstrap type (e.g., full or partial re-bootstrap) and information that needs to be re-bootstrapped in the case of a specific type of re-bootstrap, in a re-bootstrap message. The re-bootstrap message can be transmitted to the M2M client through one message or multiple messages.

Smartcard Re-Bootstrap

Smartcard re-bootstrap is a re-bootstrapping procedure performed by the M2M client from a smartcard. Here, the M2M server or the M2M bootstrap server can include parameters indicating a re-bootstrap type (e.g., full or partial re-bootstrap) and information that needs to be re-bootstrapped in the case of a specific type re-bootstrap, in a re-bootstrap message for the M2M client.

Client Initiated Re-Bootstrap

Client initiated re-bootstrap is a re-bootstrapping procedure performed at the request of the M2M client. Here, the re-bootstrap request is transmitted from the M2M server and re-bootstrapping may be performed through the re-bootstrap request. The M2M server or the M2M bootstrap server can include parameters indicating a re-bootstrap type (e.g., full or partial re-bootstrap) and information that needs to be re-bootstrapped in the case of a specific type re-bootstrap, in a re-bootstrap message for the M2M client.

Server Initiated Re-Bootstrap

Server initiated re-bootstrap is a re-bootstrapping procedure at the request of the M2M server. The M2M server or the M2M bootstrap server can include parameters indicating a re-bootstrap type (e.g., full or partial re-bootstrap) and information that needs to be re-bootstrapped in the case of a specific type re-bootstrap, in a re-bootstrap message for the M2M client.

M2M Server Account Addition

An M2M server account is composed of an M2M server security object instance (for which bootstrap server resource is set to "false") and an M2M server object instance related thereto. For reference, an M2M bootstrap server account is composed of an M2M server security object instance for which the bootstrap server resource is set to "true".

TABLE 17

| Object | Object ID | Object URN | Multiple Instances? | Mandatory? |
|---|---|---|---|---|
| LWM2M Security | 0 | | Multiple | Mandatory |

TABLE 18

| Resource Name | Resource ID | Supported Operations | Multiple Instances? | Mandatory? | Type | Range or Enumeration | Units | Descriptions |
|---|---|---|---|---|---|---|---|---|
| LW M2M Server URI | 0 | | Single | Mandatory | String | 0-255 bytes | — | Uniquely identifies the LWM2M server or LWM2M bootstrap server, and is in the form: "coaps://host:port", where host is an IP address or FQDN, and port is the UDP port of the server. |
| Bootstrap-Server | 1 | | Single | Mandatory | Boolean | | — | Determines if the current instance concerns a LWM2M bootstrap server (true) or a standard LWM2M server (false) |
| Security Mode | 2 | | Single | Mandatory | Integer | 0-3 | — | Determines which security mode of DTLS is used 0: Pre-Shared Key mode 1: Raw Public Key mode 2: Certificate mode 3: NoSec mode |
| Public Key or Identity | 3 | | Single | Mandatory | Opaque | | — | Stores the LWM2M client's certificate (certificate mode), public key (RPK mode) or PSK identity (PSK mode). |
| Server Public Key or Identity | 4 | | Single | Mandatory | Opaque | | — | Stores the LWM2M server's or LWM2M bootstrap server's certificate (Certificate mode), public key (RPK mode) or PSK identity (PSK mode). |
| Secret Key | 5 | | Single | Mandatory | Opaque | | — | Stores the secret key or private key of the security mode. This resource must only be changed by a bootstrap server and must not be readable by any server. |
| Short Server ID | 6 | | Single | Optional | Integer | 1-65535 | — | This identifier uniquely identifies each LWM2M server configured for the LWM2M client. This resource must be set when the bootstrap server resource has false value. Default short server ID (i.e. 0) must not be used for identifying the LWM2M server. |
| Client-Hold OffTime | 7 | | Single | Mandatory | Integer | | s | Relevant information for a bootstrap server only. The number of seconds to wait before initiating a client initiated bootstrap once the LWM2M client has determined it should initiate this bootstrap mode |

The M2M server account is included in M2M server bootstrap information which is used for the M2M client to register with the M2M server or to access the M2M server.

A description will be given of the server security object and server object instance.

The M2M server security object (or object instance) provides a key material of the M2M client suitable to access a specified M2M server or M2M bootstrap server. One object instance is recommended to address the M2M bootstrap server. While resources of the M2M server security object can be changed by the M2M bootstrap server or bootstrap from a smartcard, the resources cannot be accessed by any other M2M servers.

A description will be given of an M2M server object (or object instance). The M2M server object provides data related to an M2M server. The M2M bootstrap server does not have an object instance related thereto.

TABLE 19

| Object | Object ID | Object URN | Multiple Instances? | Mandatory? |
|---|---|---|---|---|
| LWM2M Server | 1 | | Multiple | Mandatory |

TABLE 20

| Resource Name | Resource ID | Supported Operations | Multiple Instances? | Mandatory? | Data Type | Range or Enumeration | Units | Descriptions |
|---|---|---|---|---|---|---|---|---|
| Short Server ID | 0 | R | Single | Mandatory | Integer | 1-65535 | — | Used as link to associate server object instance. |
| Lifetime | 1 | R, W | Single | Mandatory | Integer | | s | Specify the lifetime of the registration in seconds. |
| Default Minimum Period | 2 | R, W | Single | Optional | Integer | | s | The default value the client should use for the minimum period of an observation in the absence of this parameter being included in an observation. If this resource doesn't exist, the default value is 1. |
| Default Maximum Period | 3 | R, W | Single | Optional | Integer | | s | The default value the client should use for the maximum period of an observation in the absence of this parameter being used in an observation. |
| Disable | 4 | E | Single | Optional | | | | If this resource is executed, this M2M server object is disabled for a certain period defined in the disabled timeout resource. After receiving "execute" logical operation, client must send response of the operation and perform de-registration process, and underlying network connection between the client and server must be disconnected to disable the M2M server account. After the above process, the M2M Client must not send any message to the server and ignore all the messages from the M2M server for the period. |
| Disable Timeout | 5 | R, W | Single | Optional | Integer | | s | A period to disable the server. After this period, the M2M client must perform registration process to the server. If this resource is not set, a default timeout value is 86400 (1 day). |
| Notification Storing When Disabled or Offline | 6 | R, W | Single | Mandatory | Boolean | | | If true, the M2M client stores "Notify" logical operations to the M2M server while the M2M server account is disabled or the client is offline. After the M2M server account is enabled or the client is online, the M2M Client reports the stored "Notify" logical operations to the server. If false, the M2M client discards all the "Notify" logical operations or temporally disables the Observe function while the M2M server is disabled or the client is offline. The default value is true. The maximum number of storing notification per the server is up to the implementation. |
| Binding | 7 | R, W | Single | Mandatory | String | | | This resource defines the transport binding configured for the client. If the client supports the binding specified in this resource, the client must use that for current binding and mode. |
| Registration Update Trigger | 8 | E | Single | Mandatory | | | | If this resource is executed the M2M client shall perform an "Update" logical operation with this M2M Server using the current transport binding and mode. |

Check Message Transmitted Through Bootstrap Interface

In partial re-bootstrap according to the aforementioned embodiment of the present invention, it is necessary to check whether the re-bootstrap message (i.e., operation instruction for performing bootstrap) has been transmitted through the bootstrap interface.

As described above, a specific operation instruction through the bootstrap interface may be a write or create operation instruction and is transmitted through CoAP PUT or CoAP POST, which is not described in detail in the specification. The M2M client can confirm an M2M server that has transmitted the operation instruction through CoAP PUT or CoAP POST.

Whether the operation instruction has been transmitted (or received) through the bootstrap interface can be checked on the basis of whether the server that has transmitted the operation instruction is the M2M bootstrap server. That is, when the M2M server that has transmitted the operation instruction is the M2M bootstrap server, it is possible to determine that the operation instruction is transmitted through the bootstrap interface.

More specifically, the M2M client can confirm whether the M2M server is the M2M bootstrap server by checking whether a "bootstrap server" resource included in the M2M server security object instance is set to "true" or "false" with reference to the M2M server security object instance. Upon reception of an operation instruction, the M2M client confirms an entity that has transmitted the operation instruction. When information used to decode the operation instruction is information (e.g., LWM2M server URI, public key or identity, server public key or identity, secret key resource value of the like) of an M2M server security object instance in which the "bootstrap server" resource is set to "true", the message (or operation instruction) has been transmitted through the bootstrap interface. Accordingly, the M2M client neither performs an authentication procedure for the operation instruction nor considers presence or absence of the target of the operation instruction, that is, an object, an object instance or a resource.

Access Control Related Operation According to Addition of M2M Server Account

A description will be given of operation of the M2M client when an M2M server account is added to an M2M server account existing in the M2M client according to another embodiment of the present invention.

An access control object instance for object instances existing in the M2M client is generated or corrects the access control object instance when the access control object instance already exists. Object ID of a present object instance is set to an object ID resource value in the access control object instance for each object instance in the M2M client and object instance ID of the present object instance is set to an object instance ID resource value. ACL resources in the access control object instance are set such that the existing M2M server (identifier indicating the M2M server) has the access right for the corresponding object instance. The existing M2M server (identifier indicating the M2M server) is set to an access control owner in the access control object instance.

More specifically, if a new M2M server account is added when the M2M client has only one M2M server account, the M2M client can generate or correct access control object instances for all object instances therein, more preferably, object instances other than a server security object instance and access control object instance. In this case, the access control object instances are generated or corrected according to the following rule.

Access control owner is set to the existing M2M server. The existing M2M server is set to have all access rights.

The aforementioned rule can be respectively generated for two access control object instances with different access rights. In this case, access rights specified in the two access control object instances are combined into full access rights.

A specific operation instruction (e.g., create) may be excluded from the full access right.

A description will be given of operation of the M2M client when a new M2M server account is added to two or more M2M server accounts existing in the M2M client according to another embodiment of the present invention.

When two M2M server accounts are present, an access control object instance related to an object instance is automatically generated when a specific M2M server generates the object instance. The access control object instance is set as follows.

Object ID and object instance ID resources have object ID and object instance ID of an object instance generated according to "Create" operation.

ACL resources are set such that the M2M server (identifier indicating the M2M server) that performs "Create" operation has all access rights.

The access control owner is set to the M2M server (identifier indicating the M2M server).

When an M2M server account is added to two M2M server accounts, an additional procedure is not present.

More specifically, when the M2M client has two or more M2M server accounts and one of the M2M servers transmits "Create" for a specific object instance, the M2M client can generate an access control object instance for the generated object instance. In this case, the access control object instance is generated or corrected according to the following rule.

Access control owner is set to the M2M server that creates the object instance.

The M2M server which creates the object instance is set to have all the access right.

The aforementioned rule can be respectively generated for two access control object instances with different access rights. In this case, access rights specified in the two access control object instances are combined into full access rights.

A specific operation instruction (e.g., create) may be excluded from the full access right.

Figure 9:
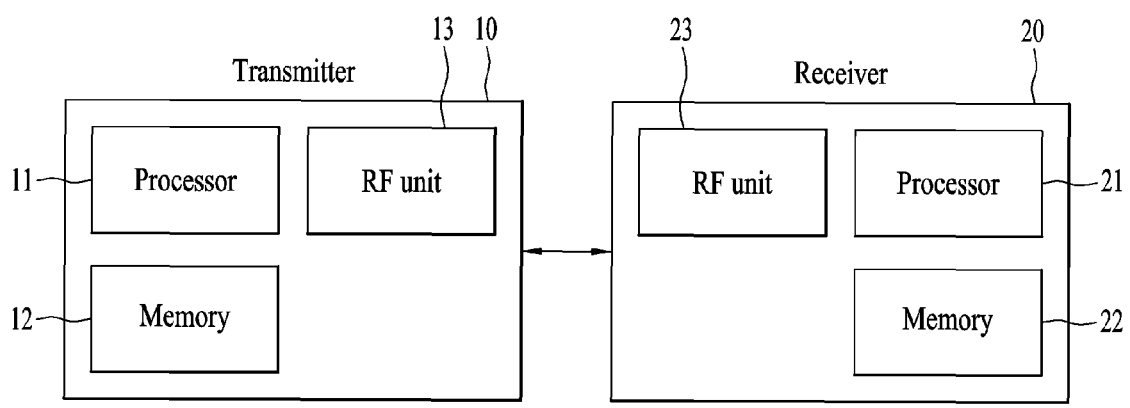
FIG. 9 is a block diagram of an apparatus for implementing embodiments of the present invention.

FIG. 9 is a block diagram of an apparatus for implementing the embodiments of the present invention. A transmitter 10 and a receiver 20 respectively include radio frequency (RF) units 13 and 23 for transmitting and receiving RF signals carrying information and/or data, signals, messages, etc., memories 12 and 22 storing information related to communication in a wireless communication system, and processors 11 and 21 which are operatively connected to the RF units 13 and 23 and the memories 12 and 22 and control the RF units 13 and 23 and the memories 12 and 22 such that the transmitter and the receiver perform at least one of the embodiments of the present invention.

The memories 12 and 22 can store programs for processing and control of the processors 11 and 21 and temporarily store input/output information. The memories 12 and 22 can function as buffers.

The processors 11 and 21 control overall operations of modules in the transmitter and the receiver. Particularly, the processors 11 and 12 can execute various control functions for implementing the present invention. The processor may be referred to as a controller, microcontroller, microprocessor, microcomputer, etc. The processors 11 and 21 may be achieved by various means, for example, hardware, firmware, software, or a combination thereof. When the present invention is implemented using hardware, ASICs (application specific integrated circuits), DSPs (digital signal processors), DSDPs (digital signal processing devices), PLDs (programmable logic devices), FPGAs (field programmable gate arrays), etc. configured to implement the present invention can be included in the processors 11 and 12. When the present invention is implemented using firmware or software, firmware or software can be configured to include a module, a procedure, a function, etc. for executing functions or operations of the present invention. The firmware or software configured to implement the present invention can be included in the processors 11 and 21 or stored in the memories 12 and 22 and executed by the processors 11 and 21.

In the embodiments of the present invention, an M2M server, an M2M client, a server or a terminal can operate as an apparatus in which the M2M server, M2M client, server or terminal is mounted or installed, that is, the transmitter 10 or the receiver 20.

The M2M server, M2M client, server or terminal as the transmitter or receiver can be configured such that the aforementioned embodiments of the present invention are independently applied or two or more thereof are simultaneously applied.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for a terminal, a base station, a server or other apparatus of a wireless mobile communication system.

The invention claimed is:

1. A method for updating, by a terminal, bootstrap information regarding a server in a wireless communication system, the method comprising:
receiving, from the server, a write operation instruction for an object instance of the terminal or a resource belonging to the object instance, the object instance and the resource being a target of the write operation instruction and the write operation instruction including at least part of the bootstrap information to be updated; and
performing the write operation instruction to write the at least part of the bootstrap information regardless of whether the target of the write operation instruction exists within the terminal when the write operation instruction is received through a bootstrap interface; and
transmitting a response indicating an error if the target of the write operation does not exist when the write operation instruction is received through a device management and service enablement interface.

2. The method according to claim 1, further comprising determining whether the write operation instruction is received through the bootstrap interface.

3. The method according to claim 2, further comprising determining whether the server transmitting the write operation instruction is the same as a server indicated by a specific resource included in a specific object instance.

4. The method according to claim 3, wherein the specific object instance includes a machine-to-machine (M2M) server security object instance.

5. The method according to claim 3, wherein the specific resource includes a resource indicating an identifier of a machine-to-machine (M2M) server and a resource indicating a bootstrap server.

6. The method according to claim 1, wherein, when the write operation instruction is received through the bootstrap interface, access control for the write operation instruction is not performed.

7. The method according to claim 1, further comprising creating a machine-to-machine (M2M) server security object instance and an M2M server object instance related to the M2M server security object instance when the write operation instruction is for addition of a new server account.

8. The method according to claim 7, further comprising creating an access control object instance for the created M2M server object instance when the write operation instruction for addition of a new server account is received when only one server account is present in the terminal.

9. The method according to claim 1, further comprising, when the write operation instruction indicates a specific machine-to-machine (M2M) server security object and an M2M server security object instance related to the specific M2M server security object, and a specific M2M server object and an M2M server object instance related to the specific M2M server object, creating the specific M2M server security object instance and the specific M2M server object instance.

10. The method according to claim 9, further comprising creating an access control object instance for the created M2M server object instance when the write specific operation instruction is received when only one server account is present in the terminal.

11. A terminal configured to update bootstrap information regarding a server in a wireless communication system, the terminal comprising:
a radio frequency (RF) unit; and
a processor configured to:
control the RF unit to receive, from the server, a write operation instruction for an object instance of the terminal or a resource belonging to the object instance, the object instance and the resource being a target of the write operation instruction and the write operation instruction including at least part of the bootstrap information to be updated, and
perform the write operation instruction to write the at least part of the bootstrap information regardless of whether the target of the write operation instruction exists within the terminal when the write operation instruction is received through a bootstrap interface; and
control the RF unit to transmit a response indicating an error if the target of the write operation does not exist when the write operation instruction is received through a device management and service enablement interface.

* * * * *